F. G. SLEMMER.
VELOCIPEDE.

No. 184,435. Patented Nov. 14, 1876.

WITNESSES-
H. J. Richardson
M. G. Abbott

INVENTOR-
Frank G. Slemmer
By Isaac R. Oakford
His Attorney

THE GRAPHIC CO. N.Y.

UNITED STATES PATENT OFFICE.

FRANK G. SLEMMER, OF PHILADELPHIA, PENNSYLVANIA, ASSIGNOR OF ONE-HALF HIS RIGHT TO HENRY A. RICHARDSON, OF SAME PLACE.

IMPROVEMENT IN VELOCIPEDES.

Specification forming part of Letters Patent No. 184,435, dated November 14, 1876; application filed October 10, 1876.

*To all whom it may concern:*

Be it known that I, FRANK G. SLEMMER, of the city and county of Philadelphia, and State of Pennsylvania, have invented a new and useful Improvement in Velocipede and detachable driving-horse, which improvement is fully set forth in the following specification, reference being had to the accompanying drawings.

This invention is intended more particularly for the amusement and gratification of young persons; and it consists in providing the velocipede with shafts, in which a detachable wooden horse is geared, the front legs of which are mounted upon a guide-wheel, which is controlled by means of reins or lines in the hands of the driver on the seat of the velocipede, and the hind legs mounted upon smaller wheels, so that the horse may be moved about in an upright position when detached from the vehicle.

My invention further consists of a simple device for attaching the horse to the vehicle, and for raising the hind feet from the ground to avoid obstruction or interfering with the free movement of the velocipede.

Figure 1:
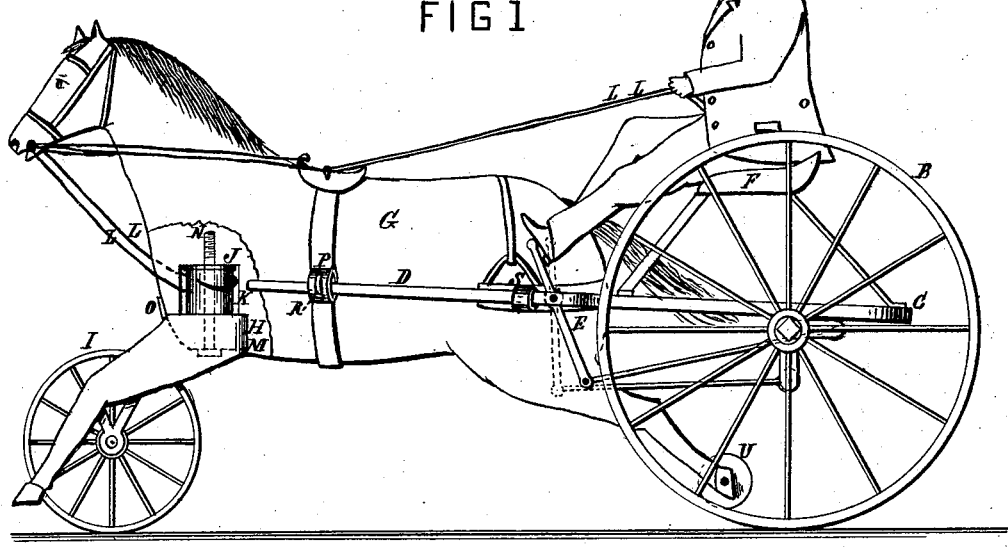
Figure 2:
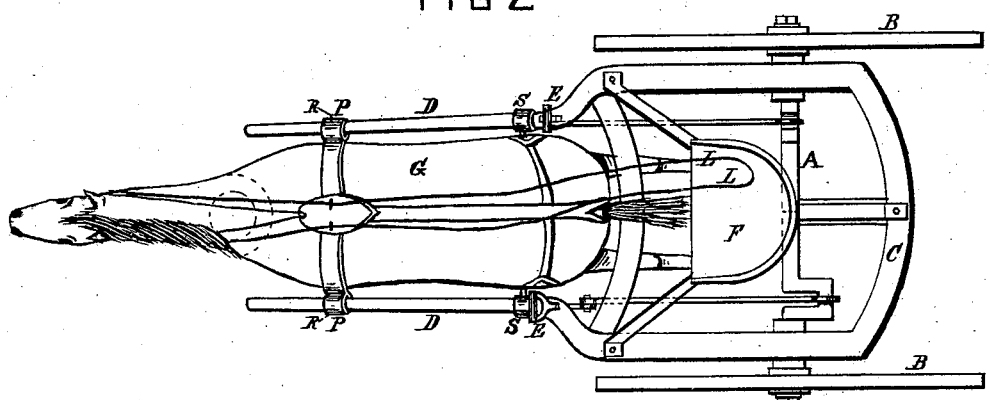
Figure 3:
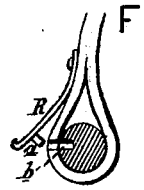
Figure 4:
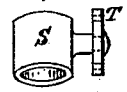

Figure 1 is a side elevation of my improvement in velocipedes and detachable horse. Fig. 2 is a plan view of the same. Fig. 3 is a transverse section of the shafts and springs for attaching the horse to the vehicle. Fig. 4 is a sectional view, detached, of the device for retaining the hind feet of the horse slightly elevated.

A is the axle, and B B the wheels, upon which the frame C and shafts D D are mounted. E E are foot-treadles, connected to the cranked axle A, and operated by the feet of the driver from the seat F. G is a horse of wood or other suitable material, having the front legs mounted upon a fifth-wheel, H, and a guide-wheel, I. J, Fig. 1, is a hub formed on the upper part of the fifth-wheel H, and inserted within a socket, K, made in the body of the horse. L L are reins passing around the said hub in opposite directions, and leading from thence through small rings or pulleys in the mouth of the horse to the hands of the driver, so as to enable him to turn the front wheels and guide the horse from his position on the seat of the velocipede.

The fifth-wheel H and the upper end of hub J both rest upon flat surfaces formed in the socket K and recess M, as shown in Fig. 1, by which means the turning-point is rendered more steady. N is a pivot-pin passing through the fifth-wheel H and hub J, with the upper end secured in the body of the horse. O, Fig. 1, is a strap or band passing around the front part of the horse, to cover up and hide the joint made by the fifth-wheel at the junction of the body of the horse. P P are loops on each side of the girth-strap, through which the shafts D D pass. R is a spring or snap attached on the outside of each loop, with a small projection, *a*, formed on the lower end, which engages with an opening, *b*, made in the side of each shaft.

The springs may be dispensed with, and set-screws substituted, if found more desirable. In detaching the horse, each of the said springs is drawn outward, to disengage the studs or projections *a*.

S S are swivel-rings, the pins or necks of which are attached to plates T T, which, in turn, are secured to the sides of the horse at or below the thigh portions, as shown in Figs. 1 and 2. The said swivel-rings are placed on the horse a short distance below the frame of the vehicle, so that when the shafts are inserted through the rings the hind feet of the horse will be raised clear of the ground.

In connecting the horse to the vehicle the swivel-rings are turned so as to admit the ends of the shafts, and the horse backed until the ends of the shafts are near the loops in the girth-strap, which are slightly higher, owing to the raised position of the front part of the horse. The shafts are then slightly elevated and passed through the loops until the spring-catches secure them in position, which operation will raise the hind part of the horse, the swivel-joint in the rings compensating for the change in position.

The hind feet of the horse are furnished with small wheels U U, to permit it to be rolled about when detached from the vehicle.

What I claim as my invention is—

1. The combination of the horse G, provided with the loops P P, springs or set-screws R R, and swivel-rings S S, with the shafts D D of the velocipede, substantially as shown and described.

2. The combination of the horse G, fifth-wheel H, hub J, socket and recess K and M, pivot-pin N, and strap or band O, substantially as shown and described.

FRANK G. SLEMMER.

Witnesses:
 ALEX. H. MORGAN,
 ISAAC R. OAKFORD.